No. 712,764. Patented Nov. 4, 1902.
A. DE CASTRO.
RECEIVER FOR WIRELESS TELEGRAPHY.
(Application filed Dec. 4, 1901.)
(No Model.)
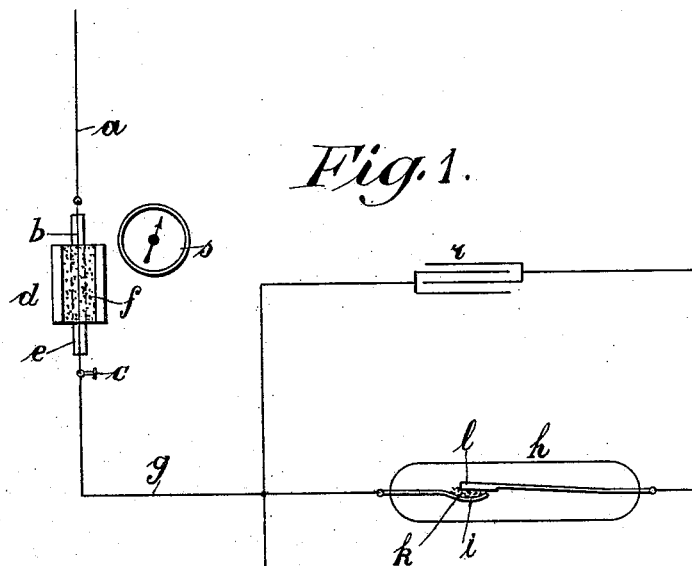
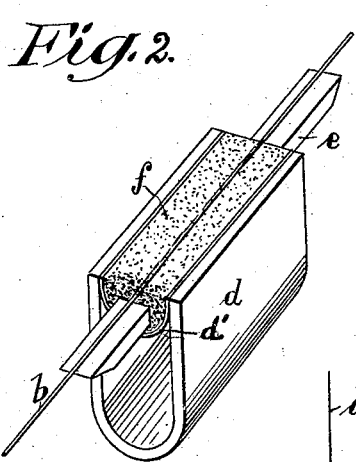
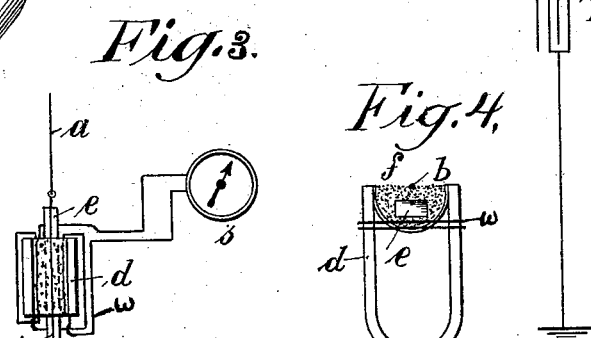
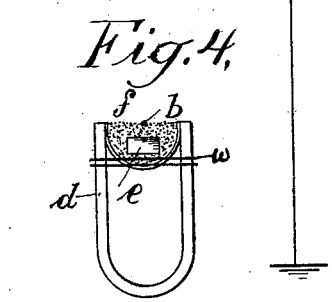
WITNESSES:
INVENTOR
Angel de Castro
BY
his ATTORNEY

UNITED STATES PATENT OFFICE.

ANGEL DE CASTRO, OF NEW YORK, N. Y., ASSIGNOR TO UNITED STATES WIRELESS MESSAGE CO., A CORPORATION OF NEW JERSEY.

RECEIVER FOR WIRELESS TELEGRAPHY.

SPECIFICATION forming part of Letters Patent No. 712,764, dated November 4, 1902.

Application filed December 4, 1901. Serial No. 84,601. (No model.)

*To all whom it may concern:*

Be it known that I, ANGEL DE CASTRO, a citizen of the United States of America, and a resident of New York, in the county of New York and State of New York, have invented certain new and useful Improvements in Receivers for Wireless Telegraphy, of which the following is a specification.

My invention relates to improvements in a system of wireless telegraphy, and it has particular reference to receivers employed therein.

The novel receiver is very sensitive and reliable, and both magnetic and static waves are made use of therein.

The receiver consists, essentially, of a conductor or wire receiving the electric waves, a fine steel wire, a magnet surrounding this wire, between the magnetic poles of which are steel filings or powdered steel in contact with the fine steel wire. Within the magnetic field of the magnet there is provided a sounding-box. The fine steel wire connects by a common conducting-wire with a sensitive tube, in which titanium filings or powdered titanium creates variations in resistance by the impact of electric waves. This is based upon the property of the microphonic contact of these titanium particles. There are further contained in branch circuits a condenser, a battery and relay, an electromagnet with armature and contact-points, and a condenser below the latter, which is connected to the ground. A magnetic needle or galvanometer is provided near the permanent magnet for the purpose of detecting electric waves in the line.

The invention is illustrated in the accompanying drawings, in which—

Figure 1 is a diagrammatical representation of all the parts composing the receiver. Fig. 2 shows in perspective view the magnet, the sounding-box provided therein, the steel wire, and steel filings. Fig. 3 shows the galvanometer connected to the magnet, and Fig. 4 is an end view of the magnet with sounding-box and fine steel wire embedded in steel particles.

Similar letters of reference denote like parts in all the figures.

In the drawings, $a$ represents the conductor or wire receiving the electric waves. $b$ is the fine steel wire connected above to the wave-receiving conductor and below to a common wire. At this junction a small device or key $c$ for stretching this fine steel wire is provided, by means of which it is stretched like a musical string. The steel wire is surrounded by a magnet $d$, preferably a permanent steel magnet, and runs through the magnetic field. Within the field there is provided a sounding-box $e$, located below the steel wire and extending beyond the magnet. A trough $d'$ in the magnetic field is filled up with fine steel filings or steel particles $f$, as shown in Figs. 2 and 4. These steel filings are held in the trough, Figs. 2 and 4, in any convenient manner.

From the fine-steel-wire-stretching device $c$ a wire $g$ connects with a sensitive tube $h$, made preferably of glass. Two platinum wires are sealed in the tube at opposite ends, one of which is connected to a small vessel or bowl $i$, of platinum or other suitable metal. This little bowl is filled with titanium filings or powdered metallic titanium $k$. The other sealed-in platinum wire is connected to an enlarged metal plate $l$, made preferably of platinum and located right above the titanium particles in the little bowl $i$. The tube is preferably exhausted for the purpose of preventing oxidation of the titanium particles. By this sensitive tube and the titanium powder contained therein variations in resistance are created by the impact of electric waves. This is based upon the property of the microphonic contact of these metallic titanium particles. The high fusion-point of titanium makes it impossible to melt the particles, no matter what kind of currents may be passed through the sensitive tube. The coherer or sensitive tube is self-recovering.

Between the magnetic device and the sensitive tube there is a branch circuit illustrated below the sensitive tube, in which a battery $m$ and relay $n$ are provided. From the relay a wire leads to an electromagnet $o$ and from there to a wire connecting with the right-hand wire of the sensitive tube. The electromagnet has an armature $p$, having a contact-point at the top, and another contact-point corresponding thereto is provided connecting with the same right-hand wire of the sensitive tube. From the armature $p$ a wire leads downward, connecting with a condenser $q$, which is grounded. Another branch circuit represented above the sensitive tube, Fig. 1, is provided, connecting with the wires leading to the sensitive tube. A second condenser $r$ is inserted in this circuit, the function of which will be explained farther down.

In order to detect the electric waves in the receiver, a magnetic needle or galvanometer is placed near the magnetic field of the magnetic device first described. This detector $s$ need not be connected by wire at all, as shown in Fig. 1, but it may be connected with the magnet $d$ by a few turns of wire $w$, which are wound around the magnet near the magnetic field, as shown in Fig. 3. An incoming electric wave will cause the needle to vibrate, thus calling the attention of the operator to an incoming message.

Assuming now that an aerial wave comes in, then there is a perturbation in the magnetic field, and therefore a change in the strengths of the field, and this variation in the field moves the needle magnetically. The fine steel wire stretched as described cuts the lines of force of the magnet by its vibration caused by the wave, and likewise the steel filings change the state of the magnetic field. The fine steel wire is stretched like a musical string, so that its natural period is harmonic to the frequency of the wave. When they correspond, then a faint sound is produced which is intensified by the sounding-box. In case the galvanometer is connected to the coils on the magnet then current is produced by any change of the field, which current moves the needle electrically. The current produced by the wave passes then through the wire $g$ and is split, as shown in Fig. 1, passing into the sensitive tube $h$ and condenser $r$. The armature $p$ is then attracted by the electromagnet $o$ and closes the circuit for the condenser $q$, which is grounded. Immediately after the current produced by a second wave passes through the circuit to coöperate with the first wave, intensifying the effect.

It is well known that the discharge of a condenser is oscillatory in character when the resistance of the circuit is less than the square root of four times the self-inductance of the circuit divided by the capacity of the circuit. The shunt containing the condenser $r$ is so designed with respect to the above law that upon the receipt of an impulse and the consequent loss of resistance of the coherer an oscillatory discharge from condenser $r$ takes place, which by creating a surging in the conductor $a$ intensifies the sound produced by the sounding-box $e$ and increases the galvanometer indication.

From the relay a connection may be made with a regular telegraph instrument in the usual manner.

This receiver will work with any type of transmitter known to-day.

Having thus described my invention, I claim as new and desire to secure by Letters Patent—

1. In a system of wireless telegraphy a receiver consisting of a wave-receiving wire, a magnetic device composed of a magnet, an adjustable fine steel wire, a sounding-box and steel particles in the field, a split circuit, a sensitive tube in the circuit, a condenser in one branch circuit, a battery, a relay, and electromagnet in the other branch circuit, an armature with contact-point on the electromagnet, a second contact-point corresponding to the first, a grounded condenser connecting with the armature and a magnetic needle near the magnetic device.

2. In a receiver for wireless telegraphy a magnetic device composed of a horseshoe-magnet, a fine steel wire in the field stretched like a musical string, a sounding-box below the fine steel wire and steel particles within the field in contact with the fine steel wire.

3. In a receiver for wireless telegraphy a magnetic device composed of a horseshoe-magnet, a fine steel wire in the field stretched like a musical string, a sounding-box below the fine steel wire, steel particles within the field, and a wave-detector near the magnetic device.

4. In a receiver for wireless telegraphy a magnetic device composed of a horseshoe-magnet, a fine steel wire in the field stretched like a musical string, a sounding-box below the fine steel wire, steel particles within the field in contact with the fine steel wire, and a galvanometer connected to the coils on the poles of the magnet.

5. In a receiver for wireless telegraphy a sensitive tube consisting of a glass tube, platinum wires sealed into the tube at opposite ends, a small metal bowl connected to one platinum wire, titanium particles contained in the bowl, and an enlarged metal plate connected to the other platinum wire in microphonic contact with the titanium particles.

6. In a receiver for wireless telegraphy a sensitive tube composed of a rarefied glass tube, two platinum wires sealed therein at opposite ends, a platinum bowl connected to one wire, titanium particles contained in the bowl and a platinum contact connected to the other platinum wire and in microphonic contact with the titanium particles.

7. In a receiver for wireless telegraphy a split circuit branching out into two directions, a sensitive tube connected to the center wire, a condenser in one branch, a battery, relay, an electromagnet with an armature and contact-points in the other branch, and a second condenser which is grounded connecting with the armature of the electromagnet.

8. In a receiver for wireless telegraphy a wave-receiving conductor, a magnetic device composed of a magnet, a fine steel wire in the field, a sounding-box below the fine steel wire and particles of steel within the field, a sensitive tube in connection with the steel wire, a condenser in one branch circuit, a battery, relay, an electromagnet with armature and contact-points in the other branch circuit and a second condenser which is grounded and connected with the armature, whereby the incoming electrostatic wave and the electrodynamic wave act successively.

9. In a receiver for wireless telegraphy a magnetic device composed of a magnet, a fine steel wire in the field stretched like a musical string, a sounding-box below the fine steel wire and steel particles within the field in contact with the fine steel wire in combination with a sensitive tube composed of a glass tube, platinum wires sealed into the tube at opposite ends, a metal bowl connected to one platinum wire, titanium particles contained in the bowl and an enlarged metal plate connected to the platinum wire and in microphonic contact with the titanium particles.

10. In combination a vibrating metallic string, a split circuit comprising an electrovariable resistance composed of titanium particles, a battery, a relay, a magnet with armature and contact-points in one branch circuit and a condenser in the other.

11. In combination a vibrating magnetic conductor, a circuit comprising a battery, an electrovariable resistance, a magnet, a relay, a shunt-circuit with a condenser and an armature having a coöperating contact, and a condenser connected thereto and to the earth.

Signed at New York, N. Y., this 3d day of December, 1901.

ANGEL DE CASTRO.

Witnesses:
   H. VON RÜCKER,
   CHARLES SCHLOEMANN.